(12) United States Patent
Schadler et al.

(10) Patent No.: US 7,559,252 B2
(45) Date of Patent: Jul. 14, 2009

(54) FORCE SENSOR FOR THE MEASUREMENT OF TENSILE FORCE IN A PULLING MEANS

(75) Inventors: Werner Schadler, Leibnitz (AT); Wolfgang Bauer, St. Johann o. H. (AT)

(73) Assignee: Magna Powertrain AG & Co KG, Lannach (AT)

( * ) Notice: Subject to any disclaimer, the term of this patent is extended or adjusted under 35 U.S.C. 154(b) by 0 days.

(21) Appl. No.: 11/999,242

(22) Filed: Dec. 4, 2007

(65) Prior Publication Data

US 2008/0127743 A1 Jun. 5, 2008

(30) Foreign Application Priority Data

Dec. 5, 2006 (DE) ........................ 10 2006 057 326

(51) Int. Cl.
*G01N 3/08* (2006.01)
(52) U.S. Cl. ........................................ 73/826
(58) Field of Classification Search ............ 73/826, 73/828
See application file for complete search history.

(56) References Cited

U.S. PATENT DOCUMENTS

| | | | |
|---|---|---|---|
| 5,060,965 A * | 10/1991 | Haefner et al. | 280/504 |
| 5,257,549 A * | 11/1993 | Mole | 73/862.392 |
| 5,661,245 A * | 8/1997 | Svoboda et al. | 73/726 |
| 6,363,793 B2 * | 4/2002 | O'Boyle | 73/828 |
| 6,640,648 B2 * | 11/2003 | Chamings et al. | 73/826 |
| 6,732,592 B1 * | 5/2004 | Blackburn et al. | 73/826 |
| 6,854,975 B2 * | 2/2005 | Ranzinger | 434/16 |
| 7,275,452 B2 * | 10/2007 | Kurtz et al. | 73/862.391 |
| 7,423,511 B2 * | 9/2008 | Nakasone et al. | 338/2 |

FOREIGN PATENT DOCUMENTS

| | | |
|---|---|---|
| DE | 10 2005 028 123 | 10/2006 |
| WO | 2006 006670 | 1/2006 |
| WO | 2006 006677 | 1/2006 |

* cited by examiner

*Primary Examiner*—Lisa M. Caputo
*Assistant Examiner*—Freddie Kirland, III
(74) *Attorney, Agent, or Firm*—Harness, Dickey & Pierce, P.L.C.

(57) ABSTRACT

A force sensor for the measurement of tensile forces in a pulling means. The force sensor has a base body which has a first abutment at a first end for the fixing of an end of a first pulling means and a second abutment at a second end disposed diametrically opposite the first end for the fixing of an end of a second pulling means. An electromechanically operating force measurement sensor is arranged at least in the region of one of the abutments such that a tensile force is transmitted from the end of the first pulling means via the force measurement sensor to the first abutment and from there via the second abutment to the second pulling means. A replacement of the second pulling means is only possible when the base body of the sensor has been moved into a waiting position.

10 Claims, 8 Drawing Sheets

FORCE SENSOR FOR THE MEASUREMENT OF TENSILE FORCE IN A PULLING MEANS

CROSS-REFERENCE TO RELATED APPLICATIONS

This application claims the benefit of DE 10 2006 057 326.9, filed Dec. 5, 2006. The disclosure of the above application is incorporated herein by reference.

FIELD

The present disclosure relates to a force sensor with which tensile forces in a pulling means, such as a wire of a Bowden cable or in a linkage, may be determined directly.

BACKGROUND

The statements in this section merely provide background information related to the present disclosure and may not constitute prior art.

The statements in this section merely provide background information related to the present disclosure and may not constitute prior art.

A force measurement may be desirable, for example, with an electromechanically actuated emergency brake device of a motor vehicle in which the parking brakes arranged at the wheels of the motor vehicle are actuated by an actuator via pulling means such as wires or linkages. Since it is desirable for at least the wheel brakes on one axle to be tightened by equal measure, there is a need to determine the tensile force in the pulling means leading to the wheel brakes.

Tensile forces in the pulling means may be determined indirectly via a sensor path measurement using comparatively strong springs that are guided in cylindrical guides and that are in turn connected in series to the pulling means whose tensile force should be determined. Such indirect tensile force measurements using springs are, however, comparatively imprecise and require a large construction space and they are, therefore, not suitable for the determination of tensile forces that prevail in the pulling means of a parking brake of a motor vehicle.

SUMMARY

The present disclosure provides a realization with which a precise detection of the tensile forces prevailing in the pulling means of a parking brake is possible in a direct manner.

A force sensor according to the present disclosure have a base body that is defined by a first end and by a second end in the pulling direction. The base body has a first abutment at its first end for the fixing of a first end of a first pulling means. In a corresponding manner, the base body has a second abutment at the second end disposed opposite the first end in the direction of force flow for the fixing of an end of a second pulling means. A first pulling means and a second pulling means are admittedly spoken of here for reasons of clarity, but they are ultimately two longitudinal sections of one and the same pulling means in whose extent the force sensor in accordance of the present disclosure is connected in series. For the detection of the tensile forces prevailing in the pulling means, an electromechanically operating force measurement sensor is arranged at least in the region of one of the abutments such that a tensile force is transmitted from the end of the first pulling means via the electromechanically operating force measurement sensor to the first abutment element and from there via the second abutment element to the second pulling means. In this respect, the first pulling means is supported indirectly via the force measurement sensor at the first abutment element on application of a tensile force.

Where a pulling means is spoken of here, all suitable means are to be understood thereby which are in a position to transfer tensile forces. A pulling means can in particular be a wire of a Bowden cable or a linkage for the actuation of the brake levers of a wheel brake. The named base bodies may, for example, be a hollow body that receives the force measurement sensor and that has suitable mounts for the fixing of the first or second pulling means at its two ends mutually oppositely disposed in the pulling direction. The hollow space of the base body may be defined by a substantially closed jacket surface, with the jacket surface transmitting the tensile forces introduced into the abutments by the pulling means between the two walls of the base body.

Instead of defining the hollow space of the base body by a substantially closed jacket surface, the base body may likewise be formed by a grid body surrounding the hollow space of the base body in the form of individual tie bars or the like between the two abutments that define the base body in the pulling direction. The base body may thus, for example, be formed by a type of frame or cage that is bounded at two mutually oppositely disposed ends by a respective abutment for the fixing of one of the pulling means.

To fix the ends of the two pulling means in or at the abutments of the two mutually oppositely disposed ends of the base body, the pulling means may be equipped at their ends with suitable anchor elements or hinge devices that are attached to the pulling means at the ends thereof in a force transmitting and/or shape matched manner.

To ensure a problem-free installation of the first pulling means with its end at the first abutment, the first abutment may be formed at the first end of the housing by a cover that is releasable from the housing and that is provided with a passage opening for the first pulling means opening into the hollow space of the base body. The first pulling means maybe plugged through this passage opening and may be secured against unwanted slipping out in a force transmitting and/or shape matched manner so that a reliable introduction of force into the first abutment or the base body may be ensured. To attach the abutment cover releasably to the base body, known techniques may be used such as crimping or beading. Alternatively, the abutment cover may also be fixedly screwed, for example, to the base body via a screw thread or may be attached thereto by means of a bayonet fixing.

In accordance with another embodiment of the force sensor, the electromechanically operating force measurement sensor is arranged at the side of the cover facing the hollow space of the base body such that the first pulling means extending through the passage opening of the cover is supported indirectly at the cover via the force measurement sensor on application of a tensile force.

Where a force measurement sensor is spoken of within the framework of the present disclosure, the force-measuring element is not, for instance, to be understood hereby; the force-measuring element is rather in turn enclosed in a metal body which is made, for example, in the form of a perforated disk or of a ring and which in turn has an opening coinciding with the named passage opening at the center for the leading through of the first pulling means. The component called a force measurement sensor is thus the body that is, for example, substantially of disk shape and that in turn accepts the force-measuring element or elements.

As already mentioned, the force measurement sensor may, for example, have a ring-shaped design with an opening which is in particular smaller than the passage opening of the cover of the base body. In the installed state of the force measurement sensor, the opening thereof is disposed concentrically to the passage opening of the cover so that the boundary of the opening of the force measurement sensor projects into the opening region of the passage opening of the cover as a result of its smaller size. In this manner, the part of the force measurement sensor projecting into the passage opening of the cover forms a direct abutment for the first end of the first pulling means from where the introduced tensile forces are transmitted to the abutment cover.

In accordance with yet another embodiment, the ring shaped force measurement sensor may be fitted between the cover and the base body in a force transmitting and/or shape matched manner. In this manner, a simple and reliable introduction of force into the force measurement sensor as well as a reliable reproducibility of the measured data may be ensured.

The force measurement sensor or the force-measuring elements worked into the force measurement sensor may, for example, be a piezoelement such as piezoelectric crystal or a ceramic material. Apart from this, however, any other desired force-measuring elements may also be used with which a direct and precise detection of tensile forces is possible. For example, in addition to elements measuring piezoelectric force, such elements may thus also be used which are based on a capacitive, resistive, or piezoresistive functional principle. In an embodiment as a piezoresistive force measurement sensor, the electrical resistance varies in dependence on the force application.

As already previously indicated, the two pulling means may be provided at their ends with suitable anchor elements to be able to fix the pulling means ends in or at the abutments at the two ends of the base body in a force transmitting and/or shape matched manner. Since these anchor elements may have larger dimensions with respect to the dimensions of the pulling means, the base body may be made hollow to receive the two pulling means ends, with the hollow space being bounded in the pulling direction by the two mutually oppositely disposed ends. To fix the second pulling means in or at the second abutment at the second end of the base body disposed diametrically opposite the first end, the second abutment may be substantially formed by the boundary of an opening which extends through the second end of the base body and opens into the hollow space of the base body. It would naturally admittedly likewise be possible also to design the second end of the base body releasably in accordance with the first end of the base body at the oppositely disposed side in the form a cover, but this may be dispensed with since the releasable attachment of the abutment cover to the first end of the base body is already sufficient for the installation of the force sensor into the pulling means as well as for the replacement of one of the pulling means. However, the second end may also be releasably attached to the base body in the form of a cover to further improve the installation possibilities.

To ensure a particularly simple installation and removal of the second pulling means into or out of the second abutment, the boundary of the abutment opening may be interrupted at least one position such that the end of the second pulling means may be introduced through the interruption into the abutment opening of the second abutment. In other words, the abutment opening may merge at the position of the interruption into a type of slot through which the second pulling means may be introduced into the abutment opening.

To counter an unwanted slipping out of the second abutment element through the interruption in the abutment opening, however, the interruption of the boundary of the abutment opening in the second end may continue up to and into the jacket surface which defines the hollow space of the base body at the peripheral side. In this jacket surface, the continuation of the interruption may open into an introduction opening through which the end of the second pulling means together with its anchor element may be introduced into the hollow space of the base body.

As can be seen from the preceding statements, a realization is set forth for the first time with the force sensor with which tensile forces in a pulling means may be measured directly and precisely, with a fast and problem-free exchange of the pulling means being able to be ensured as a result of the construction design of the base body of the force sensor.

Since the force sensor may be a comparatively sensitive measuring device due to the force measurement sensor contained therein, there may be a need to protect the force sensor from external environmental influences such as an attack by salt or an attack by acid. In accordance with a further development of the force sensor the force sensor may be arranged displaceably in the direction of the first and second pulling means adjoining it in a stationary protective housing that shields the force sensor externally from the named environmental influences. Since the base body of the force sensor may have a substantially hollow-cylindrical shape, the protective house may be made as a guide cylinder in which the base body is arranged displaceably more or less as a piston as with a piston-in-cylinder unit in the longitudinal direction.

To lead the two pulling means out of the protective housing, the cylindrical protective body may have end walls at the head side and the foot side that are provided with corresponding openings for the leading through of the first or second pulling means as well as for the leading through of the measuring lead. In this manner, the force sensor may be displaced in the longitudinal direction of the protective body by a force application via the first or second pulling means and may be permanently protected against external environmental influences.

Since it may be necessary to guide the force sensor at least partly out of the protective housing for the replacement of the second pulling means so that the second protective means can be replaced through the introduction opening in the jacket surface, a restoring means such as a screw-like compression spring may act on the force sensor. The compression spring urges the force sensor into a waiting position in the protective housing against a deflection caused by one of the pulling means. In the waiting position, the force sensor projects so far out of the protective housing that the introduction opening is located outside the protective housing so that the second pulling means may be replaced through the introduction opening. To enable this guiding out of the force sensor from the protective housing, the end wall of the protective housing on which the end of the protective housing facing the second pulling means may be located releasably attached to the protective housing so that it may be removed from the protective housing for the setting of the waiting position of the force sensor.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A force sensor will first be explained with simultaneous reference to FIGS. 1 to 4. As can be seen from FIG. 1 in conjunction with FIG. 2, the force sensor 10 includes a beaker-shaped base body 20, a force measurement sensor 24 of perforated disk shape or of ring shape, and a cover 22. A jacket surface of beaker-shaped base body 20 surrounds a hollow space 34 in which the ends or the anchors 26, 28 of a first pulling means 12 and of a second pulling means 14 are received.

Figure 2:
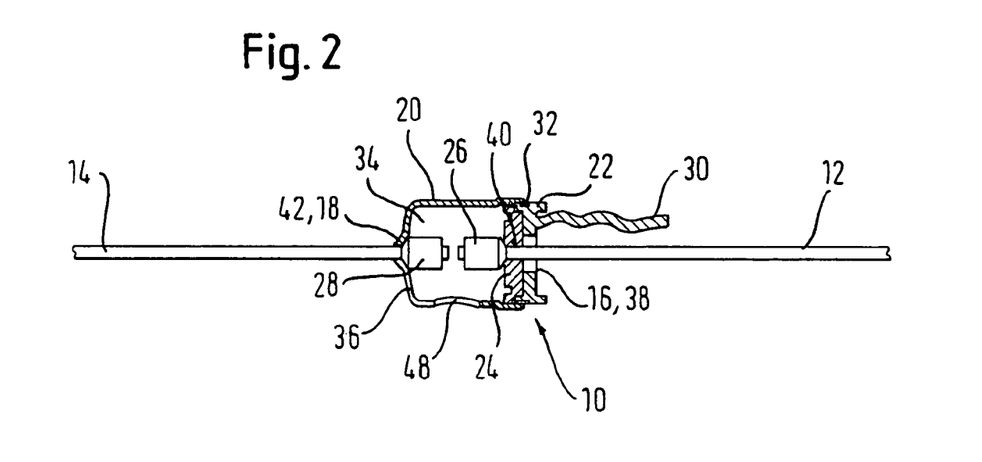
FIG. 2 illustrates a sectional view of the force sensor in accordance with FIG. 1.
Figure 3:
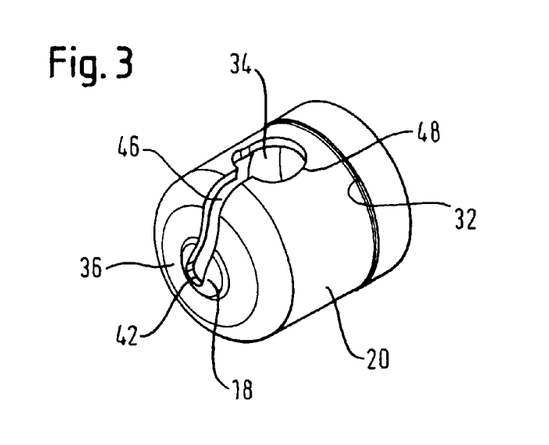
FIG. 3 illustrates a perspective representation of the force sensor alone.

As FIG. 2 shows, beaker-shaped base body 20 may be closed on a side facing first pulling means 12 by cover 22 that may, for example, be screwed to base body 20 via a screw thread 32. At the end disposed opposite cover 22 at which second pulling means 14 binds into base body 20, the latter has a base 36 that is connected in one piece to base body 20.

As may be seen from FIG. 2, the ring-shaped force measurement sensor 24 is fitted between anchor 26 of first pulling means 12 and cover 22 such that a tensile force transmitted from first pulling means 12 to anchor 26 is first transmitted to force measurement sensor 24 and from there to cover 22. Due to the force transmitting and/or shape matched connection of cover 22 to base body 20, cover 22 thus serves as an abutment 16 at which anchor element 26 is indirectly supported via force measurement sensor 24 on a force application. For the guiding through of the first pulling means into hollow space 34 of base body 20, cover 22 has a substantially centrally arranged passage opening 38 in whose continuation in the direction of hollow space 34 an opening 40 of smaller diameter adjoins in force measurement sensor 24 such that the boundary of opening 40 of force measurement sensor 24 partly covers the opening region of passage opening 28 of cover 22, whereby a direct abutment is provided for anchor head 26 of first pulling means 12.

To ensure a secure fit of first anchor 26 in opening 40, the latter can be bounded on a side facing anchor head 26 by a conical fit in which anchor head 26 made complementary thereto reliably comes to rest as a result of a tensile force application.

For the leading through of the second pulling means into hollow space 34 of base body 20, the latter also has an opening 42 in its base 36 through which second pulling means 14 projects into hollow space 34. In this connection, opening 42 can have a conical fit corresponding to the opening 40 on its side facing hollow space 34 so that anchor head 28 made complementary thereto can securely come to rest therein.

Figure 4:
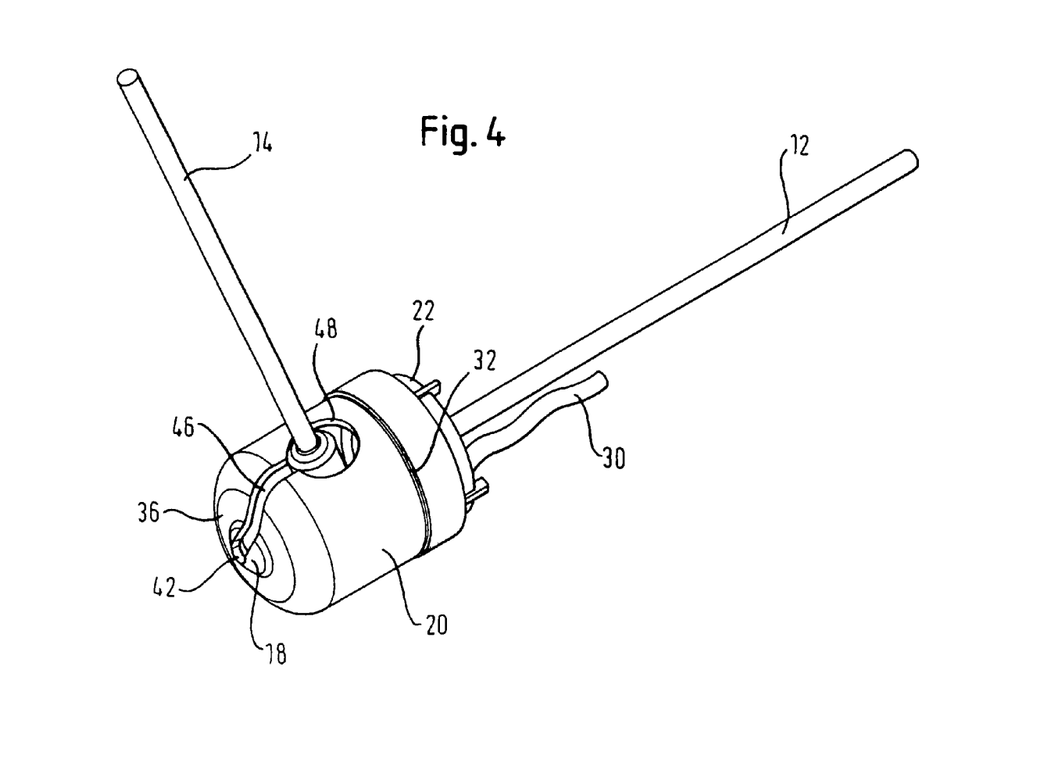
FIG. 4 illustrates a perspective representation of the force sensor on the installation of a pulling means.

To ensure a replacement of second pulling means 14, which is as easy as possible, opening 42 merges into a slot 46 which extends into the jacket surface of base body 20 and merges there into an enlarged introduction opening 48. As FIG. 4 shows, second pulling means 14 can thus be introduced in a substantially perpendicular manner together with its anchor 28 through this introduction opening 48 so that subsequently second pulling means 14 may be guided through slot 46 up to and into opening 42 in base 36.

If a tensile force is applied to force sensor 10 via first pulling means 12, tensile force propagating via second pulling means 14 in the direction of a wheel brake, the tensile force is first introduced from first pulling means 12 into anchor 26 which in turn exerts a corresponding compressive stress onto force measurement sensor 24 since the latter is held by cover 22 in the pulling direction. This compressive stress is registered by the force-measuring elements in force measurement sensor 24 so that a measured signal representative of the tensile force can be read out via a measuring lead 30 via an evaluation unit. The compressive stresses applied to force measurement sensor 24 are introduced via cover 22 into the jacket surface of base body 20 and from there via second abutment 18, which is formed by opening 42 in base 36 of base body 20, to second pulling means 14.

Overall, hereby, a simple and reliable arrangement is provided to arrange a force sensor in a force path between two pulling means, on the one hand, and to enable a replacement of the pulling means, on the other hand.

First pulling means 12 may, for example, be connected to a drive device of an emergency brake device of a motor vehicle (e.g. electric motor with step-down gear and a winding spool), whereas second pulling means 14 leads to a wheel brake of the vehicle. In this case, it is particularly advantageous for at least second pulling means 14 to be replaced easily.

A force sensor shown in FIGS. 5 to 8 substantially corresponds to the first embodiment described with reference to FIGS. 1 to 4 and differs from this only through the shape of base body 20. Generally, however, the force sensor 10 in this embodiment also includes a beaker-shaped base body 20 which is closed by a base 36 pierced by an opening 42 on the side facing second pulling means 14. In addition to base body 20, sensor 10 substantially includes a ring-shaped force measurement sensor 24 as well as a cover 36 which is pierced by a passage opening 38 and which closes base body 20 on a side disposed opposite base 36. Force measurement sensor 24 is here in turn also held in a force transmitting and/or shape matched manner in the opening region of base body 20 by cover 22 to ensure a reliable introduction of force into force measurement sensor 24.

Figure 5:
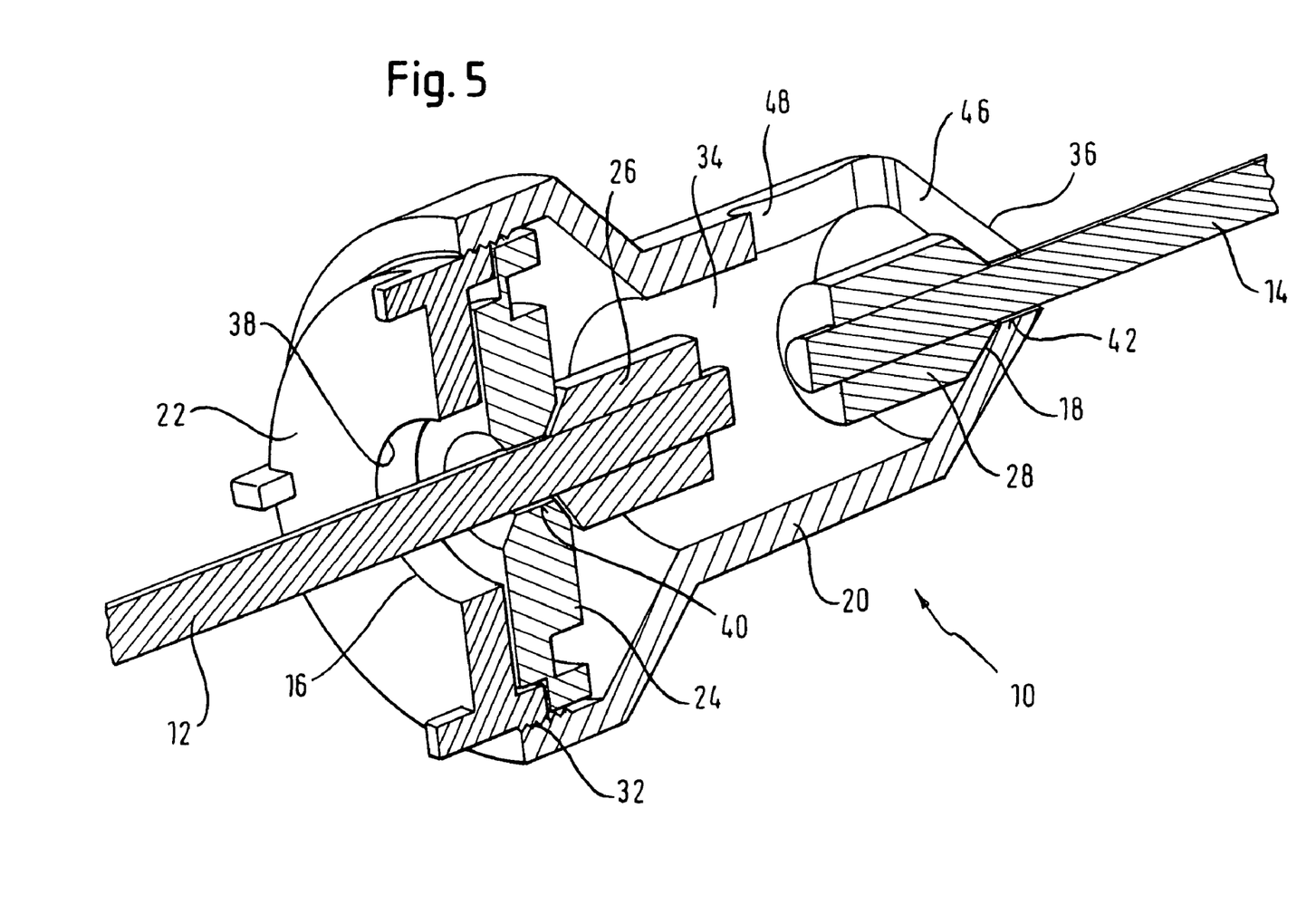
FIG. 5 illustrates a perspective sectional view of another embodiment of a force sensor.
Figure 6:
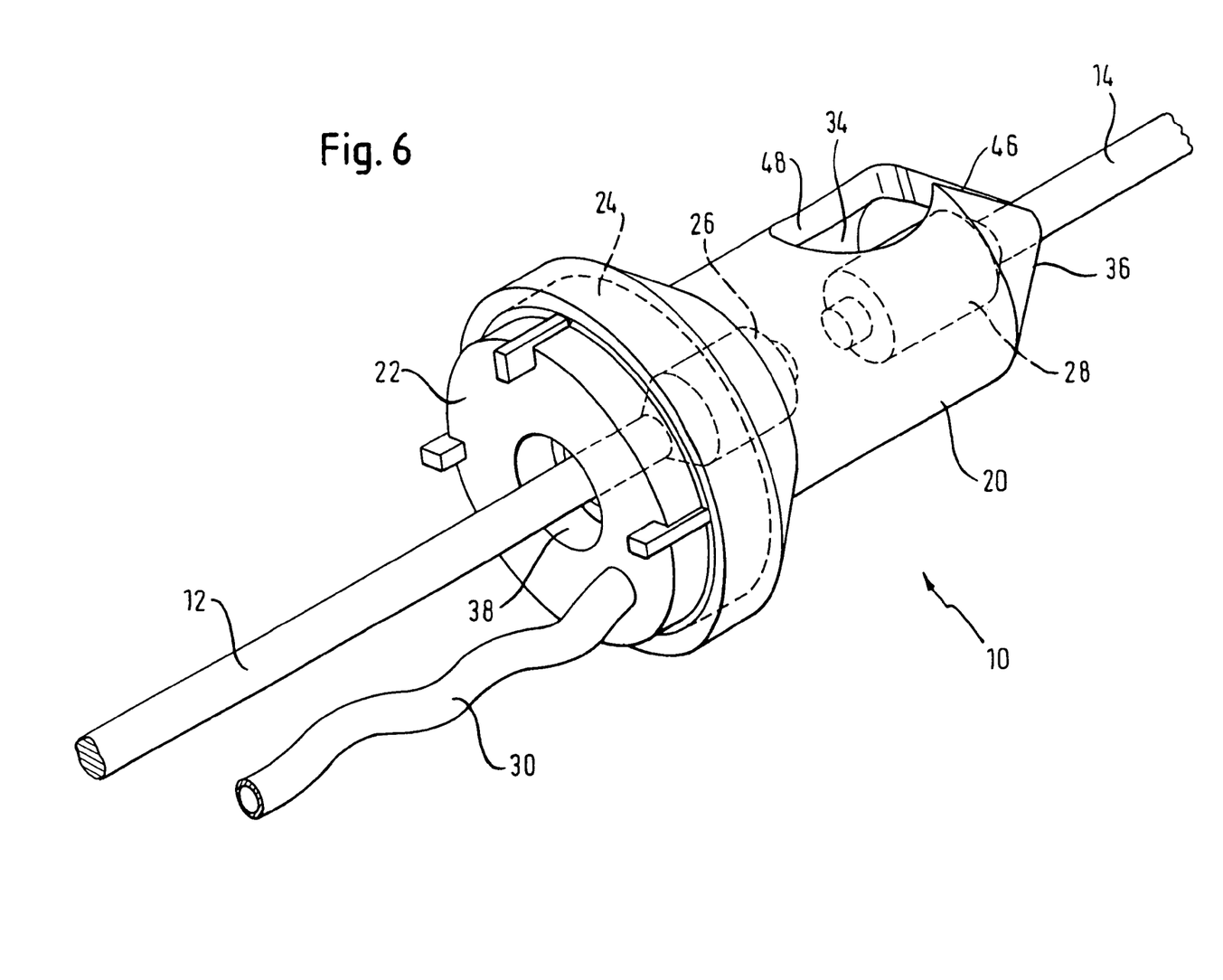
FIG. 6 illustrates a perspective representation of the force sensor in accordance with FIG. 5.

To lead through first pulling means 14 into hollow space 34 of base body 20, force sensor 24 also has an opening 40 here that is smaller than passage opening 38 of cover 22 and comes to lie concentric thereto so that the boundary of opening 40 of force measurement sensor 24 projects into the opening region of passage opening 38 and thus represents a direct abutment for first end or its anchor 16.

As can be seen particularly clearly from FIG. 5, openings 38 and 40 have conical fit surfaces so that anchors 26, 28 made complementary thereto are held securely and fully therein on a corresponding tensile force application.

Figure 7:
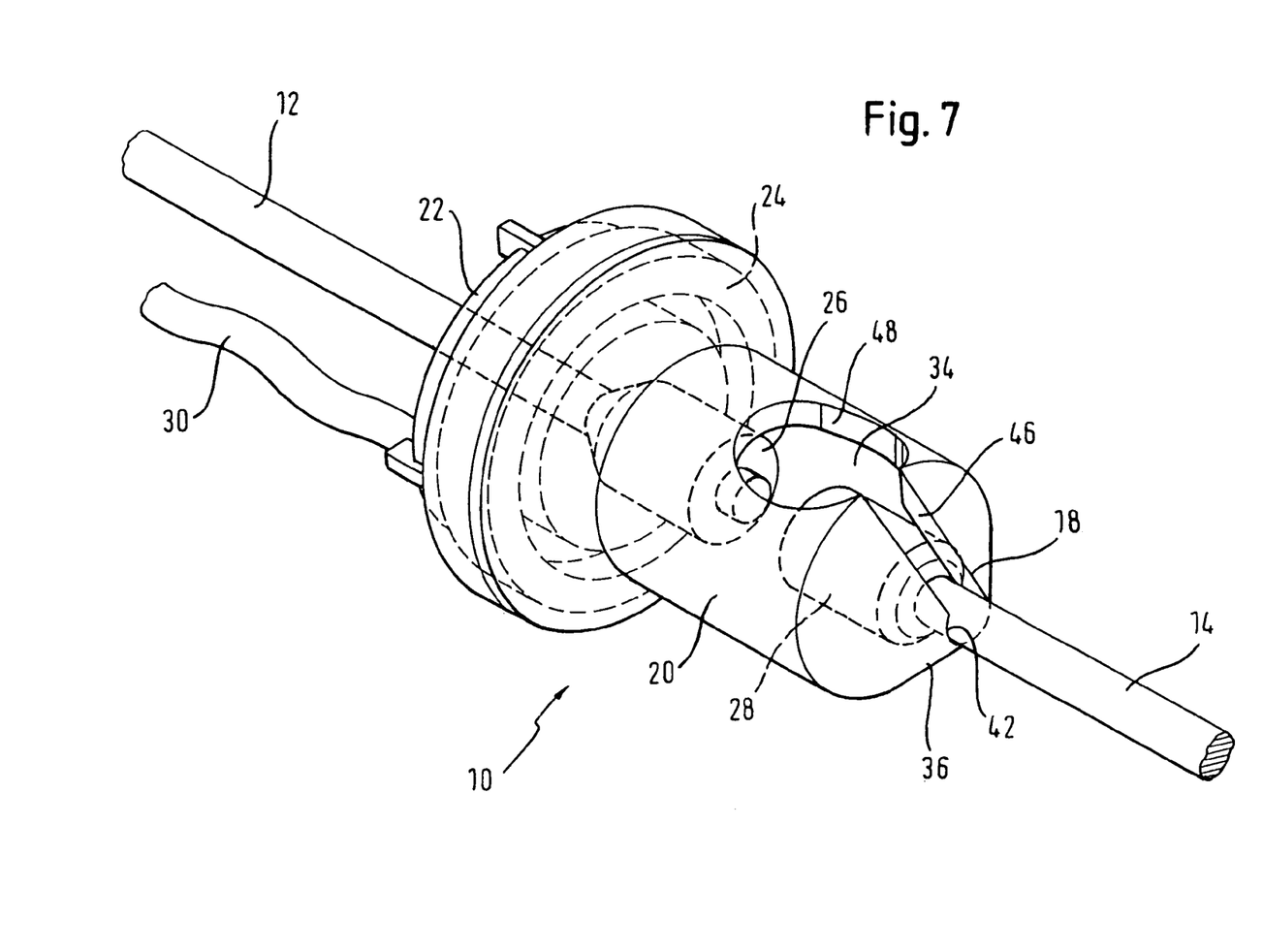
FIG. 7 illustrates a perspective representation of the force sensor in accordance with FIG. 6 from a different direction of gaze.
Figure 8:
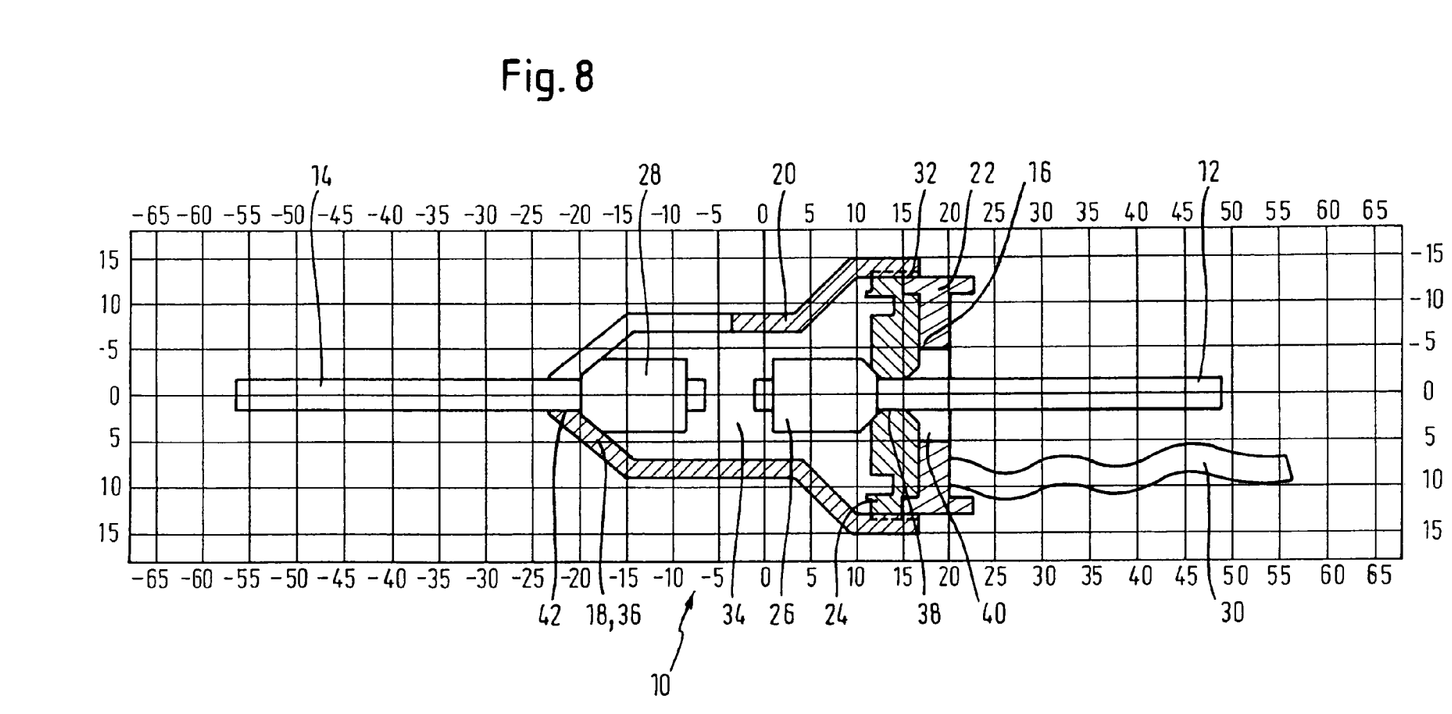
FIG. 8 illustrates a schematic sectional representation of the force sensor in accordance with FIG. 5, including a dimensioning from which the size ratios of the force sensor can be seen.

As can be seen particularly clearly from FIGS. 7 and 8, the base-side opening 40 in this second embodiment also merges into a slot 46 which extends up to and into the jacket surface of base body 20 where slot 46 opens into an introduction opening 48 which is dimensioned so large that anchor 28 of second pulling means 14 may be guided through it easily.

As can be seen from the preceding statements for the explanation of the second embodiment in accordance with FIGS. 5 to 8, this second embodiment thus corresponds to the first embodiment (FIGS. 1 to 4), with the exception of the shape of the base body, so that reference is made to the statements on FIGS. 1 to 4 with respect to further details.

Beaker-shaped base body 20 tapers starting from cover 22 as well as force measurement sensor 24 adjoining it in a direction of second pulling means 14 such that hollow space 34 of base body 20 may be dimensioned smaller, which conversely has the result of a smaller dimensioning of the jacket surface around hollow space 34. Since, however, it is a question of selecting as space saving constructions as possible, particularly in the automotive sector where such force sensors are primarily used, since the available space is limited as a rule, it is of advantage to provide base body 20 with the indent selected here in the longitudinal direction to take account of the limited available space in the sector of automotive engineering.

Figure 1:
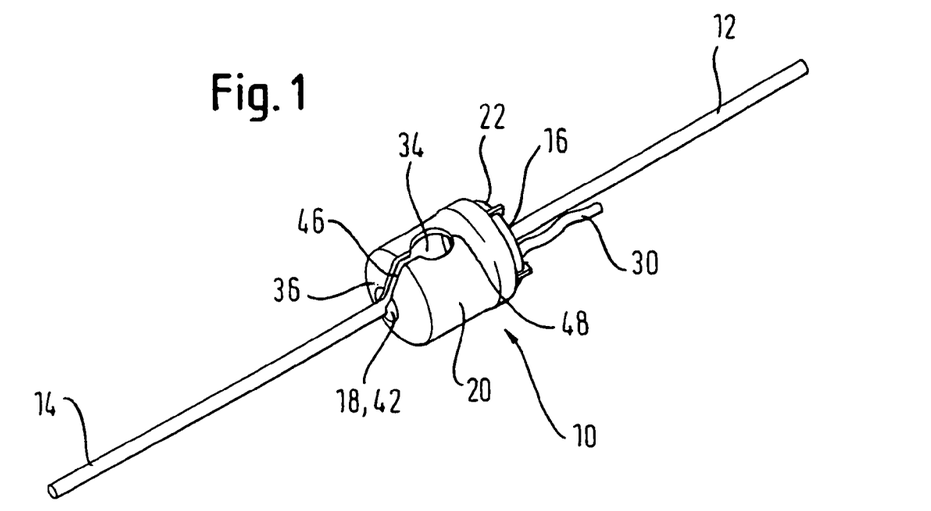
FIG. 1 illustrates a perspective view of the force sensor in an installed state.
Figure 9:
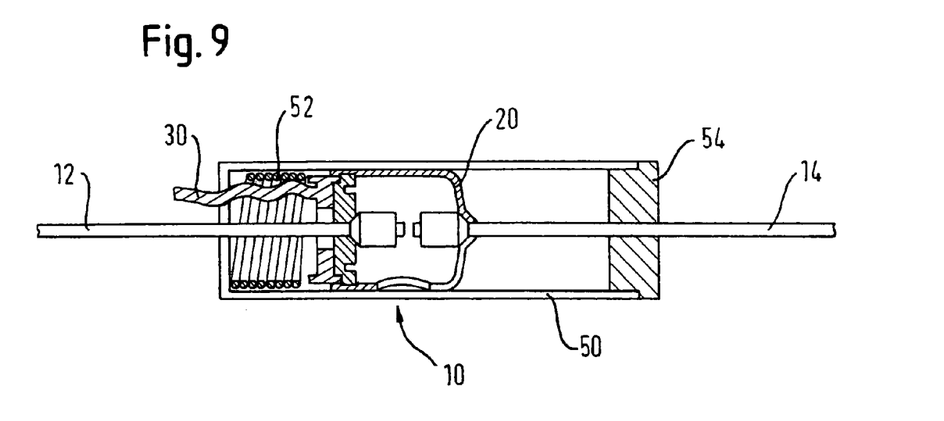
FIG. 9 illustrates a working position of the force sensor in a protective housing.
Figure 10:
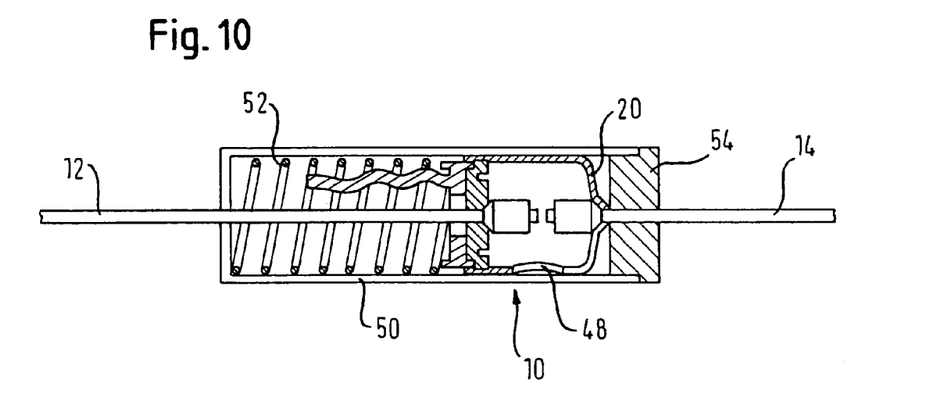
FIG. 10 illustrates a further working position.
Figure 11:
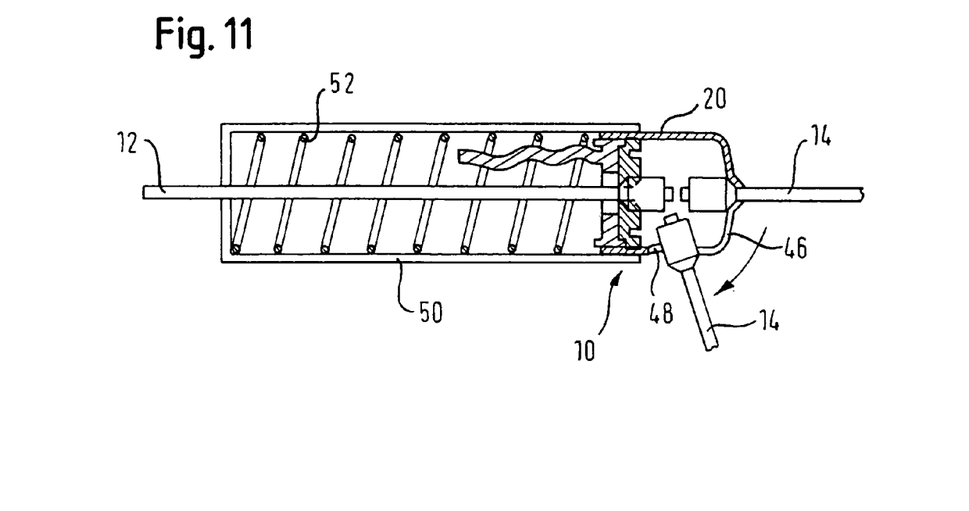
FIG. 11 illustrates the waiting position of the force sensor in the protective housing.

FIGS. 9 to 11 show the force sensor 10 of FIGS. 1 and 4, with it being installed in a stationary hollow cylindrical protective housing 50. Housing 50 more or less represents a cylinder as in a piston-in-cylinder unit for base body 20 of force sensor 10, with base body 20 being able to be displaced more or less as a piston in the longitudinal direction of the protective housing 50. On the side facing first pulling means 12, protective housing 50 is closed by an end wall with, however, corresponding openings being provided for the leading through of a measuring lead 30 and of first pulling means 12. A compression spring 52 is supported at this end wall and urges base body 20 against the tensile force applied by an actuator onto first pulling means 12 in the illustrations of FIGS. 9 to 11 to the right hand side.

Compression spring 52 is provided for the case that, for example, second pulling means 14 should be replaced as the result of a defect. Since, in this case, base body 20 may possibly no longer be pulled out of protective housing 50 by means of second pulling means, compression spring 52 provides a corresponding lifting movement of base body 20 out of protective housing 50. This, however, requires that the releasable end wall 54 that is located on the right hand side of protective housing 50 has been removed. It is moreover necessary for first pulling means 12 to be released for such a lifting movement of base body 20. First pulling means 12 therefore has to be directly moved into a waiting position by a corresponding control of the associated drive device (e.g. electric motor). Base body 20 of sensor 10 may be hereby, as shown in FIG. 11, project at least so far out of protective housing 50 that introduction opening 48 is located outside protective housing 50. In this position, which represents the waiting position of base body 20, the defective second pulling means 14 may thus be pivoted via slot 46 up to and into introduction opening 48, as FIG. 11 shows, so that the defective second pulling means 14 may be removed and a new pulling means inserted. Subsequently, a tensile force may again be applied to first pulling means 12 via the named drive device to move force sensor 10 back into the working positions of FIGS. 9 and 10.

Due to the housing of force sensor 10 in protective housing 50, the force sensor 10 is thus protected against mechanical and weather influences, which increases the service life of force sensor 10, on the one hand, and prevents an unwanted falsification of the measured results, on the other hand. Due to the explained necessity of moving first pulling means 12 directly into a waiting position for a replacement of second pulling means 14, an unauthorized replacement be prevented, for example in that the required control of the drive device is only possible with knowledge of a specific code.

FIGS. 12 and 13 again show another embodiment of force sensor 10. It has a stamped bending part of metal as base body 20. First pulling means 12 is here made as a linkage in the form of a yoke pair hinged to base body 20, with the two yokes being connected to the ring-shaped force measurement sensor 24 via two fastening pins 56. Fastening pins 56 engage through the frame-shaped base body 20 through two elongate holes not shown in any more detail. Instead of the shown direct fastening of fastening pins 56 to force measurement sensor 24, the pins may be provided at an auxiliary frame that receives force measurement sensor 24 inside base body 20. Second pulling means 14 has an anchor 28 such as explained, for example, in connection with FIGS. 1 to 4.

Figure 12:
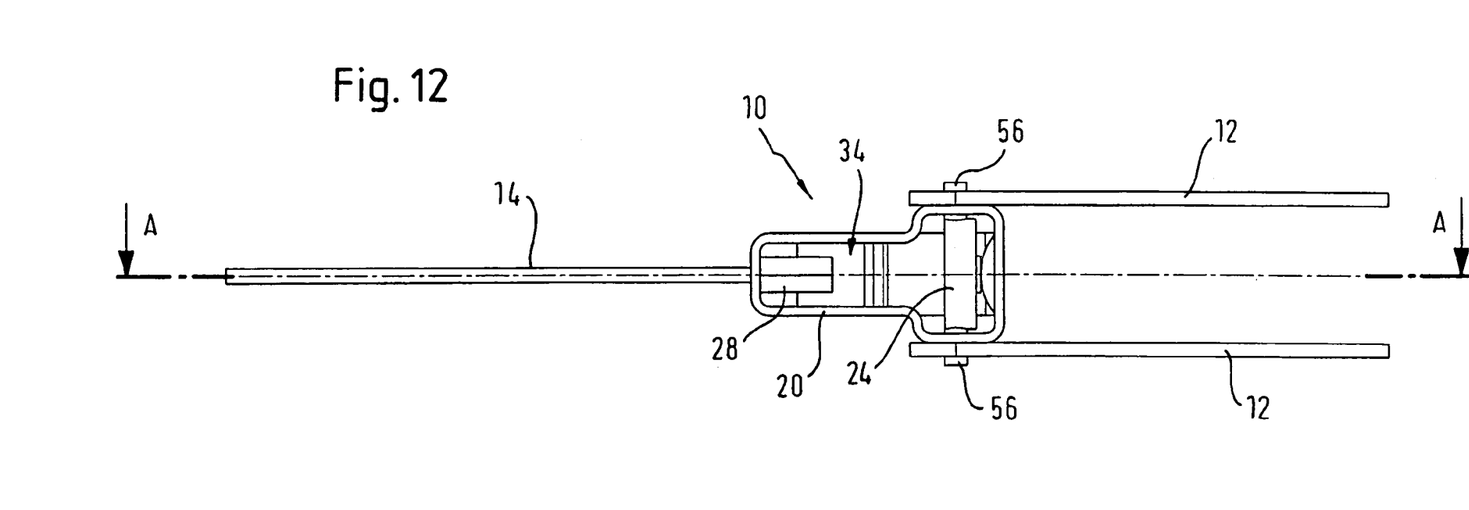
FIG. 12 illustrates a plan view of another embodiment of a force sensor.
Figure 13:
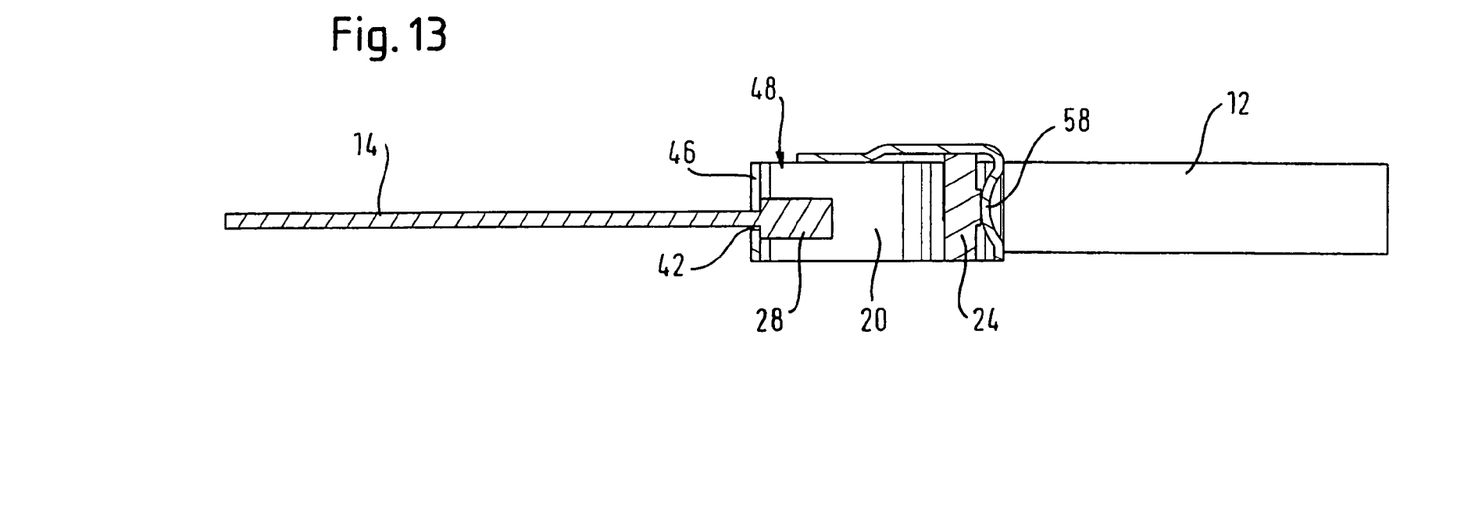
FIG. 13 illustrates a sectional representation of the force sensor in accordance with FIG. 12 along the plane A-A.

Frame-shaped base body 20 has an inwardly facing dimple 58 which engages centrally at force measurement sensor 24. First pulling means 12 is thus supported at dimple 58 of base body 20 via fastening pins 56 and via force measurement sensor 24 on an application of tensile force.

Base body 20 has opening 42 as an abutment for holding of the second pulling means 14 at the base body. To enable a replacement of second pulling means 14, opening 42 merges into slot 46 which extends up to a jacket surface of base body 20 and merges there into an enlarged introduction opening 48.

What is claimed is:

1. A force sensor for the measurement of tensile forces in a pulling means comprising: a base body having a first abutment at a first end for fixing an end of a first pulling means, and a second abutment at a second end disposed opposite the first end for fixing an end of a second pulling means, wherein the base body is substantially hollow for receiving the ends of the first and second pulling means, and is bounded by the two mutually oppositely disposed ends in the pulling direction, wherein the first abutment is formed at the first end of the base body by a cover that is releasable from the base body and that is provided with a passage opening for the first pulling means that opens into a hollow space of the base body,
   wherein an electromechanically operating force measurement sensor is arranged at least in a region of one of the abutments such that a tensile force is transmitted from the end of the first pulling means via the force measurement sensor to the first abutment and from there via the second abutment to the second pulling means, and further wherein the force measurement sensor has a ring-shaped design with an opening that is smaller than the passage opening of the cover and is concentric thereto so that a boundary of the opening of the force measurement sensor projects into an opening region of the passage opening of the cover and represents a direct abutment for the first end of the first pulling means.

2. The force sensor in accordance with claim 1, wherein the electromechanically operating force measurement sensor is arranged on a side of the cover facing the hollow space of the base body such that the first pulling means extending through the passage opening of the cover is supported indirectly via the force measurement sensor at the cover on a tensile force application.

3. The force sensor in accordance with claim 1, wherein the ring-shaped force measurement sensor is fitted in a force transmitting and/or shape matched manner between the cover and the base body.

4. The force sensor in accordance with claim 1, wherein the base body has a frame that is formed as stamped bending part made of metal.

5. The force sensor in accordance with claim 1, wherein the first pulling means and/or the second pulling means is formed by either at least one yoke hinged to the base body or by a yoke pair.

6. The force sensor in accordance with claim 1, wherein the force measurement sensor is coupled to the first pulling means via two laterally projecting fastening pins, with the fastening pins being connected to the force measurement sensor directly or via an auxiliary frame.

7. The force sensor in accordance with claim 1, wherein the force measurement sensor operates in accordance with a functional principle which is selected from the group consisting of measuring capacitively, resistively, piezoelectrically and piezoresistively.

8. A force sensor for the measurement of tensile forces in a pulling means comprising: a base body having a first abutment at a first end for fixing an end of a first pulling means, and a second abutment at a second end disposed opposite the first end for fixing an end of a second pulling means, wherein an electromechanically operating force measurement sensor is arranged at least in a region of one of the abutments such that a tensile force is transmitted from the end of the first pulling means via the force measurement sensor to the first abutment and from there via the second abutment to the second pulling means, the second abutment being substantially formed by a boundary of an opening in the second end of the base body that opens into a hollow space of the base body, and further wherein the boundary of a abutment opening expands to an introduction opening for the introduction of the end of the second pulling means into the hollow space of the base body, with the introduction opening being connected to the abutment opening via a slot.

9. The force sensor in accordance with claim 8, wherein the introduction opening is made at a jacket surface of the base body that laterally surrounds the hollow space.

10. A force sensor for the measurement of tensile forces in a pulling means comprising: a base body having a first abutment at a first end for fixing an end of a first pulling means, and a second abutment at a second end disposed opposite the first end for fixing an end of a second pulling means, wherein an electromechanically operating force measurement sensor is arranged at least in a region of one of the abutments such that a tensile force is transmitted from the end of the first pulling means via the force measurement sensor to the first abutment and from there via the second abutment to the second pulling means, the force sensor being arranged movably in a direction of the first and second pulling means adjoining it in a stationary protective housing, wherein a restoring means urges the force sensor into a waiting position against a deflection caused by one of the pulling means, wherein the protective housing has an opening on a side facing the second pulling means through which the force sensor extends at least so far in the waiting position that the second pulling means is replaceable through an introduction opening in the jacket surface of the base body.

* * * * *